Jan. 31, 1961     E. T. MOSBY     2,969,715
REAR VIEW MIRROR
Filed Sept. 29, 1958     2 Sheets-Sheet 1
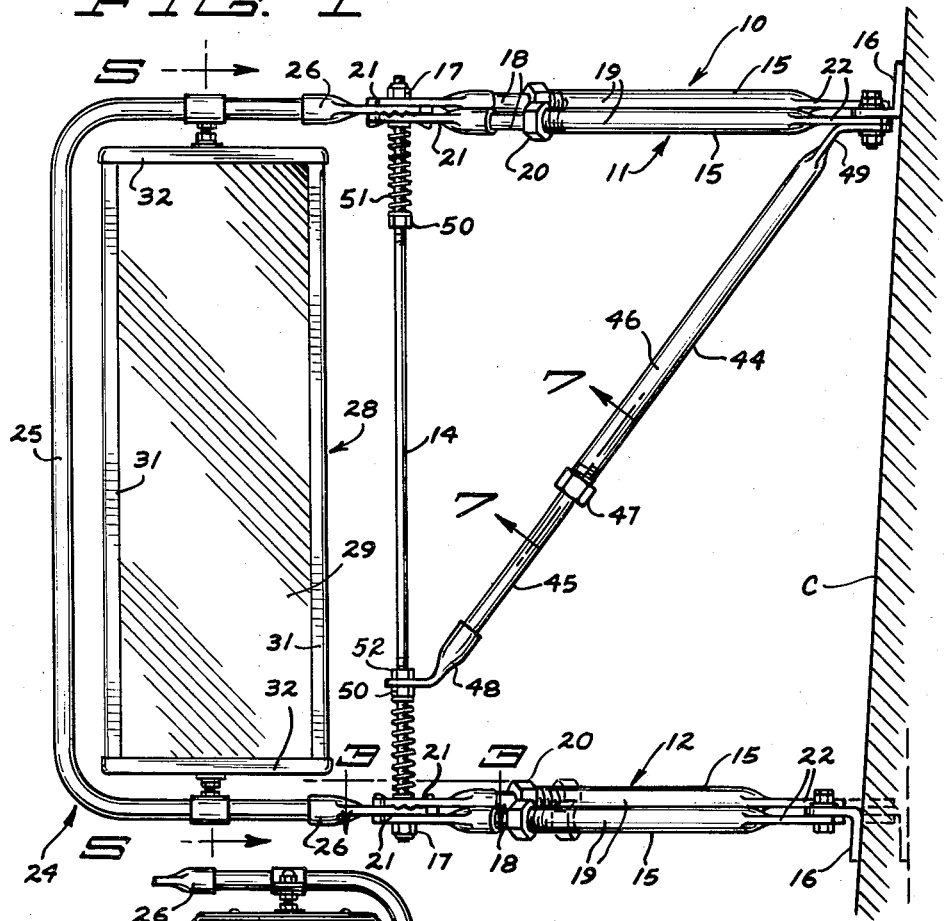
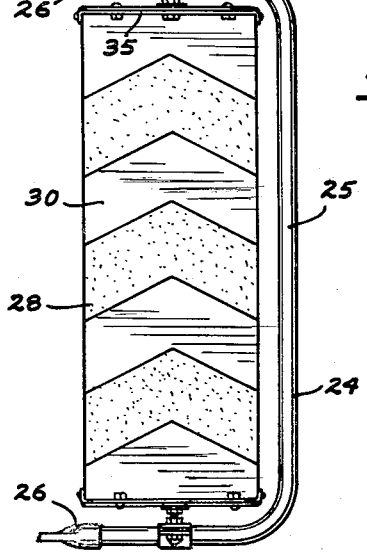
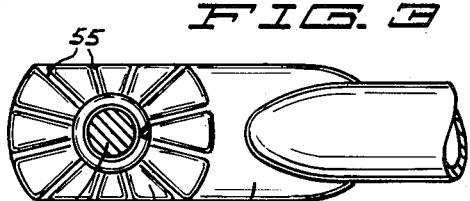
INVENTOR.
EDGAR T. MOSBY
BY
ATTORNEYS Jan. 31, 1961  E. T. MOSBY  2,969,715
REAR VIEW MIRROR
Filed Sept. 29, 1958  2 Sheets-Sheet 2
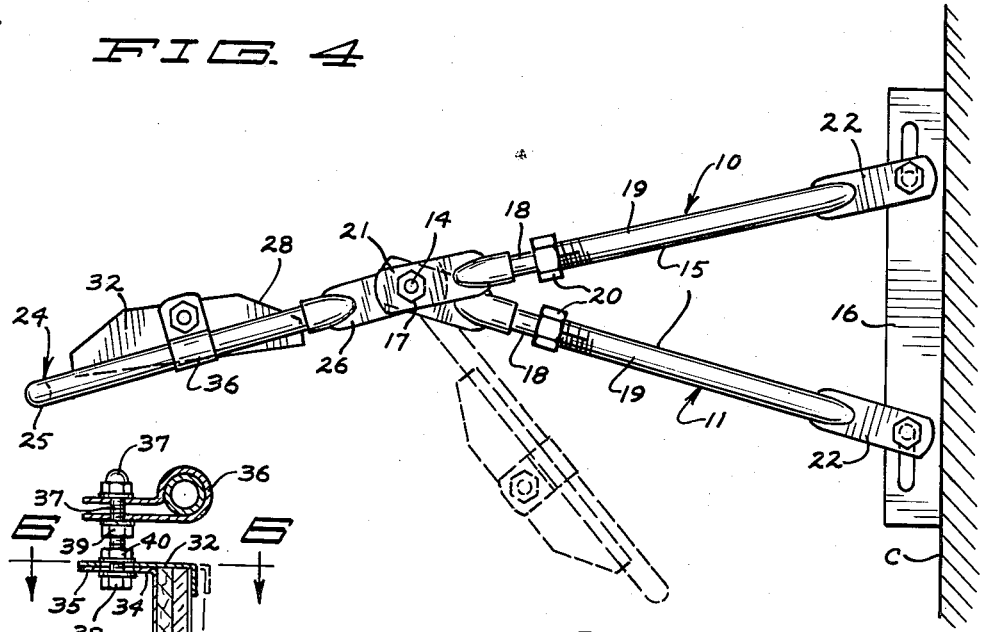
FIG. 4
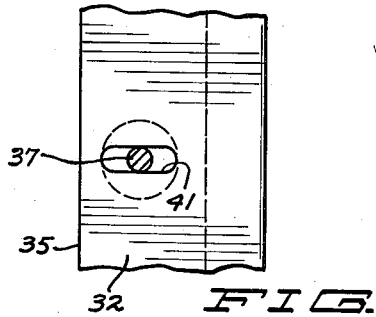
FIG. 5
FIG. 6
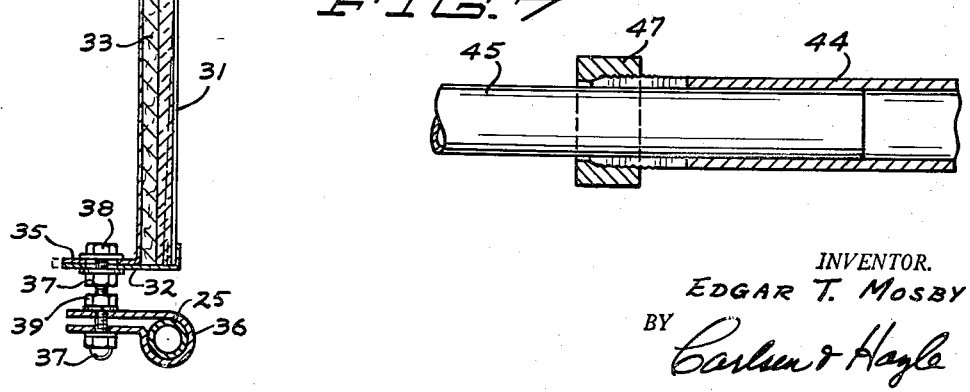
FIG. 7
INVENTOR.
EDGAR T. MOSBY
BY
Carlsen & Hagle
ATTORNEYS United States Patent Office 2,969,715
Patented Jan. 31, 1961

2,969,715
REAR VIEW MIRROR

Edgar T. Mosby, Minneapolis, Minn., assignor to Re-Trac Manufacturing Corporation, Minneapolis, Minn., a corporation of Minnesota Filed Sept. 29, 1958, Ser. No. 764,013

2 Claims. (Cl. 88—98)

This invention relates generally to side mounted rear view mirrors for vehicles and more particularly concerns the mounting or support means for such mirrors.

The present invention concerns improvements over the device disclosed in Patent No. 2,488,316 entitled Adjustable Mirror Support which issued November 15, 1949, to the present applicant. As brought out in that patent it is generally necessary to provide a mounting means for truck mirrors which extends laterally a substantial distance to enable the driver to view the road past the sides of the truck body which is normally of somewhat greater width than the truck cab on which the mirror is mounted. With the mirror support means thus extended beyond the lateral limits of the truck, it is obviously subjected to breakage through engagement with buildings or other vehicles.

The primary object of the present invention is to provide a new and improved mirror supporting device adapted to firmly, adjustably and yieldably support and to protect a rear view mirror on a truck cab.

Another object of the invention is to provide a new and improved rear view mirror supporting device which is adapted to firmly yet releasably support a mirror of substantial height allowing the driver a broad vertical range of view.

With these objects in mind the invention broadly comprises a bracket means adapted to be mounted on the cab and having a pair of vertically spaced support arms extending laterally from the cab, a mirror carrying frame having portions pivotally connected to the extended end of each arm on a common vertical axis, each of said pivotal connections including complementary teeth on the interconnected members arranged circumferentially about the pivot axis, and spring means acting upon the connection to yieldably hold the teeth in mesh to prohibit turning of the frame about the axis.

The above mentioned and still additional objects of the invention will be brought to light during the course of the following specification, reference being made to the accompanying drawings, in which—

Fig. 1 is a rear elevation of the mirror and its supporting structure mounted on a truck cab.

Fig. 2 is a front elevation of the structure showing the back side of the mirror.

Fig. 3 is a horizontal section taken on line 3—3 of Fig. 1.

Fig. 4 is a plan view of the mirror and supporting structure mounted on a truck with the mirror shown in extended position in full lines and in collapsed position in broken lines.

Fig. 5 is a vertical section through the mirror taken along line 5—5 of Fig. 1.

Fig. 6 is a horizontal section taken on line 6—6 of Fig. 5.

Fig. 7 is a section taken on line 7—7 of Fig. 1.

Referring now more particularly to the drawings reference characters will be used to denote like parts or structural features in the different views. The letter C denotes the side portion of a truck cab on which the mirror is mounted. The bracket means for mounting the mirror is designated generally by the number 10. It comprises an upper mounting arm 11 and a lower mounting arm 12 which are interconnected at their outer ends by a rod 14. Each arm consists of a pair of length adjustable arm members 15 arranged in a V-shape with their inner ends secured in spaced relation to an angle iron strip 16 mounted on cab C. The outer ends of the members 15 are apertured for reception of the rod 14 in vertically spaced relation and are held against endwise removal therefrom by the nuts 17 threaded on the end portions of the rod.

Each member 15 comprises inner and outer tubular sections 18 and 19 telescopically associated. Sections 18 and 19 are held in length adjusted condition by means of nut 20 having a tapered internal thread and which is threaded on the tapered external thread formed at the split end of section 19. Each member 15 may accordingly be adjusted for length by loosening nut 20 and then retightening it to clamp the end portion of section 19 securely about the section 18. The extended ends of the sections 18 and 19 are flattened as denoted at 21 and 22 respectively.

The mirror frame is designated generally at 24 and comprises a U-shaped tubular member 25 having flattened terminals 26 connected to each end. These terminals are apertured to be journaled on rod 14 between the members 21 on each arm 11. Accordingly, the frame 24 is swingable about the axis of rod 14 which is disposed in an upright or generally vertical position.

A mirror unit designated generally at 28 is mounted on the frame 24. This unit comprises a rectangular plate of mirror glass 29 mounted in a casing formed of a backing plate 30 having its lateral edges formed around the plate 29 as at 31 and a pair of casing end members 32 which are L-shaped in cross section to extend across the front of the mirror end portions and then extend rearwardly beyond the backing plate 30. Plate 30 has its upper and lower end edges angled rearwardly as at 34 along the members 32 to form rearwardly projecting mirror mounting flanges at each end of the mirror. A sheet 33 of styrofoam or other resilient padding material is disposed between plates 29 and 30.

The flanges formed by casing portions 32 and 34 are designated generally at 35 and provide a means for attaching the mirror unit 28 to the frame 24. Fastening loops 36 extend around each leg of the frame 24 and the end portions thereof are apertured to receive the bolt 37 which also extends through flange 35 to be held by a nut 38. Nuts 39 on each bolt 37 hold the bolt against endwise movement and positioning nuts 40 securely hold the flanges on the bolt.

The flanges 35 have elongated apertures 41 (Fig. 6) for receiving bolt 37 and extend perpendicular to the plane of the mirror enabling the mirror to be adjusted to various positions of vertical tilt as well as horizontal adjustment about the bolt axis.

The bracket means 10 is provided with a diagonally extending brace denoted generally at 44. This brace is similar in construction to members 15 being formed of telescopically associated tubular members 45 and 46 which are locked against relative extension or contraction by nut 47 threaded on the end portion of member 46. The extended ends of the brace are flattened, as at 48 and 49, for respective connection to the upper bar 16 and the rod 14.

As hereinbefore stated and as shown in the drawings the terminal elements 26 on the frame 24 are respectively disposed in sandwiched positions intermediate the portions 21 formed at the ends of members 15 in the upper and lower support arms 11. Rod 14 is threaded for a substantial distance at each end for reception of stop nuts 50. Compression coil springs 51 are disposed around each end portion of the rod intermediate nut 50 and the innermost element 21. Accordingly, the springs 51 maintain a constant outward pressure upon the members 21 holding the element 26 snugly therebetween. Nut 52 is provided on rod 14 spaced slightly above the lower nut 50 to hold the member 48 against sliding along the rod.

A releasably locking pivotal connection is provided between the terminals 21 and 26. This is accomplished by stamping each of the terminals so as to form a series of circumferentially spaced ribs or teeth 54 (Fig. 3) which encircle the rod receiving aperture in the terminal and which extend in a generally radial direction from the aperture. The ribs 54 have a cross sectional convex curvature and are separated by grooves 55, so that as the member 26 is held between the terminals 21 the rib teeth 54 at each side thereof will mate with the grooves in the facing member 21. Accordingly as the terminals are held in close contact under the compression of springs 51 the intermeshing teeth will prohibit swinging movement of frame 24 about the rod 14 until excessive turning pressure is applied thereto sufficient to cause the terminal 26 to force terminals 21 apart against spring 51 and to allow the teeth to move over each other.

Operation of the invention will be readily understood. In mounting the device the various arm members 18, 19 and 44 are adjusted for length so that the mirror will be supported at the proper distance from the cab to give an unobstructed view rearwardly. The frame 24 is set in its outwardly projecting position and the mirror 28 is adjusted about the axis of bolts 37 to the angle and tilt for observation from the operator's station in the cab. In this position the teeth 54 on the members 21 and 26 are interlocked so that normal truck vibration will not alter the preselected position of frame 24. Obviously, when the mirror is in this extended position it will of necessity project beyond the lateral limits of the truck so as to be vulnerable to engagement with building walls, other vehicles, posts and the like.

In the event that the mirror or its frame engages such an unyielding obstacle with the truck in motion the pressure on the frame 24 will be transmitted to the terminals 26 allowing the frame to rotate or fold about the rod 14. The turning pressure will cause the teeth 54 to slide out of intermeshing engagement, the terminals 21 yielding inwardly against the springs 51 until the mirror has been folded to an out of the way position. When the obstacle has been passed the mirror may then be manually returned to its extended condition.

The mirror 28 may be provided with strips of reflective material on its back side as shown in Fig. 2. Brace arm 44 gives vertical rigidity to the bracket means 10. While Fig. 7 shows the brace arm 44 it will be understood that the various arm members 15 have the same type of construction.

The structure disclosed provides a novel support means for a rear view mirror which will rigidly support a vertically elongated mirror in the desired position and yet which will collapse without breakage allowing the mirror to fold to an out of the way position when an immovable object is engaged. The device accordingly effectively and economically carries out the aforementioned objectives.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In a truck mirror, upper and lower elongated brackets adapted to be mounted on a truck cab in vertically spaced parallel positions, a vertical pivot rod, upper and lower pairs of tubular arms, the arms in each pair having their inner ends secured at longitudinally spaced points to the corresponding bracket and their outer ends having flattened terminals journaled on the pivot rod, a U-shaped mirror frame having upper and lower flattened terminals, a mirror mounted on the frame, the frame upper and lower terminals being journaled on the pivot rod and respectively sandwiched intermediate the upper and lower pairs of arm terminals and in face to face contact therewith, a pair of vertically spaced stop means on the rod, and a pair of spiral springs encircling the rod and held under compression one between each stop means and the adjacent arm terminal to hold each frame terminal tightly between its surrounding arm terminals to frictionally retain the frame against swinging movement on the rod.

2. In a rear view mirror for trucks, a bracket means adapted to be mounted on the truck cab and having two vertically spaced pairs of tubular arm members extending laterally from the bracket means, the arm members in each pair converging in their extension from the bracket means, the extended end portions of each member being horizontally flattened and apertured, an elongated pivot rod extending vertically through the apertures in said end portions, means securing the pivot rod against endwise displacement from the end portions, a mirror frame, a mirror mounted on the mirror frame, the mirror frame having spaced parallel horizontally flattened extensions journaled on the rod for swinging movement of the frame about the rod, said extensions disposed one intermediate the end portions of each pair of arms and in face to face contiguous relation to both, a pair of stop means fixedly mounted on the pivot rod in vertically spaced positions intermediate the pairs of said end portions, a pair of spiral springs encircling the pivot rod and held under compression one between each stop means and the adjacent arm end portion to yieldably urge said adjacent arm end portion axially of the rod against said mirror frame extensions, the flattened contiguous faces of each of said end portions and said extensions each being provided with a circumferential series of radially extending teeth disposed about the axis of the pivot rod with the teeth on the extension intermeshing with the teeth on the end portions on both sides thereof whereby as swinging pressure sufficient to overcome the compressive force of the springs is exerted upon the mirror frame said extensions will cause the end portions contiguous thereto to spread allowing the extensions to rotate therebetween with the teeth of the extension moving circumferentially over the teeth of said end portions.

References Cited in the file of this patent

UNITED STATES PATENTS

| | | |
|---|---|---|
| 1,676,896 | Groenenstein | July 10, 1928 |
| 1,921,310 | Crisman | Aug. 8, 1933 |
| 1,980,149 | Zink | Nov. 6, 1934 |
| 2,636,418 | Leonard | Apr. 28, 1953 |
| 2,708,086 | Prutzman | May 10, 1955 |
| 2,751,817 | Lapekas | June 26, 1956 |
| 2,860,546 | Bolser | Nov. 18, 1958 |